Dec. 1, 1964  H. M. MORRISON  3,159,826
OBSTACLE DETECTION SYSTEM
Filed March 17, 1960
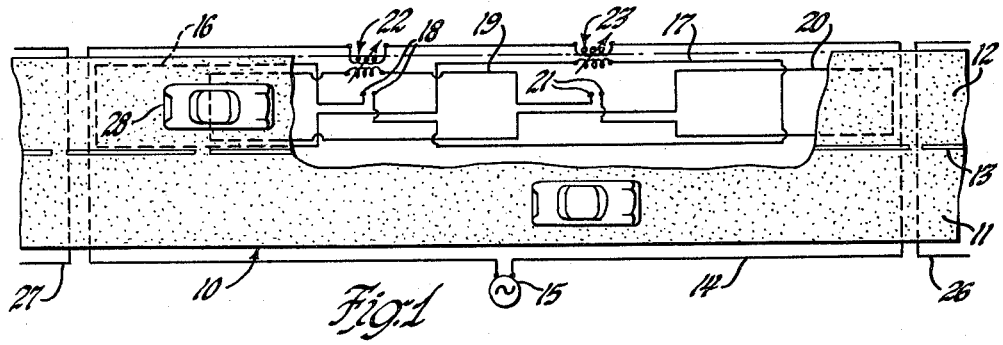
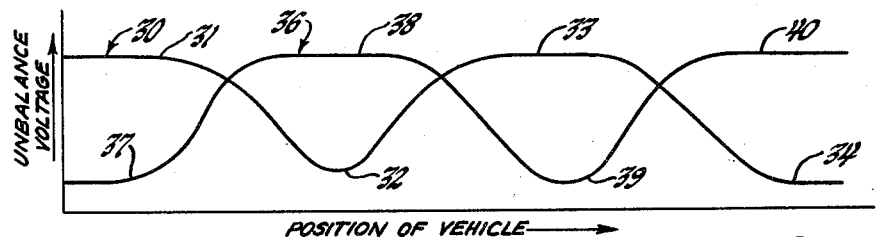
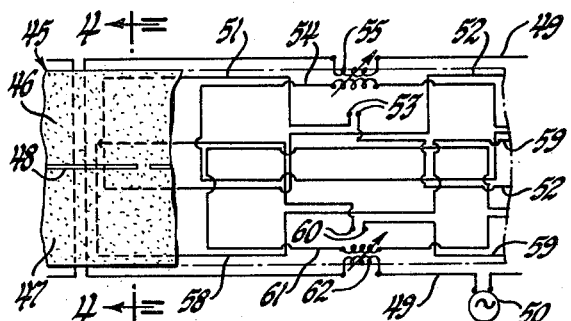
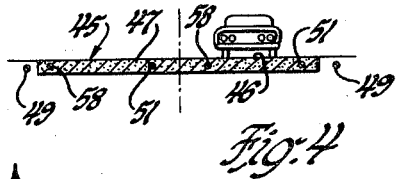
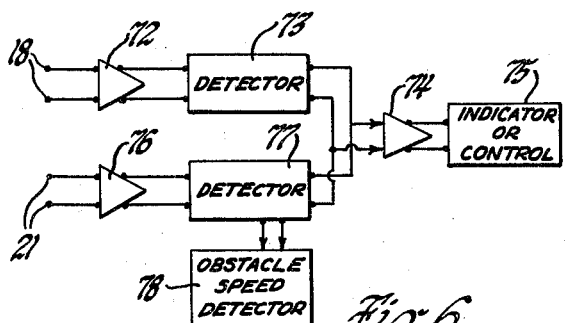
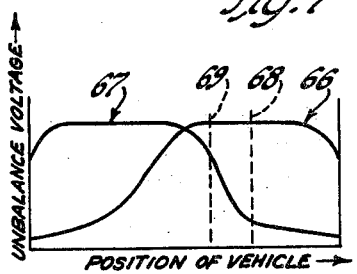
INVENTOR.
Harold M. Morrison
BY
Paul J. Ethington
ATTORNEY

United States Patent Office

3,159,826
Patented Dec. 1, 1964

3,159,826
OBSTACLE DETECTION SYSTEM
Harold M. Morrison, Birmingham, Mich., assignor to General Motors Corporation, Detroit, Mich., a corporation of Delaware
Filed Mar. 17, 1960, Ser. No. 15,629
4 Claims. (Cl. 340—258)

This invention relates to an obstacle detection system and more particularly to a system for detecting the presence of vehicles in a given lane on an automatic highway.

In any automatic control system for highways, it is necessary to have some means for detecting the presence of vehicles and determining the relative speed thereof in relation to the desired or command speed. The co-pending application S.N. 759,731, filed September 8, 1958, now Patent No. 3,068,448, assigned to the assignee of the present invention, discloses a block system of vehicle detection and control wherein each block is defined by a primary loop which is excited by a low frequency signal. Within the primary loop are a plurality of pairs of secondary loops or detector coils wherein each pair is connected in an opposing relationship. For a given physical configuration of the primary and secondary coils, the voltage induced in each secondary will be dependent upon the coupling between the primary and secondary. If a large conductive object such as a vehicle moves into the coupling path, then the voltage induced in the secondary will be reduced by an amount related to the eddy currents which are induced in the conductive material. This is due to the fact that the eddy currents will be opposed to the direction of current flow in the secondary.

Within each block, the physical size of the secondary loops must not be too much greater than the size of the objects to be detected. On the other hand, the primary loop must be of considerable length to provide the proper spacing between vehicles and so there must be a plurality of secondary loops within each primary loop. Also, it is necessary to provide more than one pair of secondary loops within a primary loop if the speed of the detected obstacles is to be determined. The secondary loops, however, must be positioned such that there will be no null points or there will always be an output, no matter what position the vehicle is in relation to the primary coil.

Also, when two adjacent automatic lanes are employed, it is necessary for a given vehicle to be notified not only when there is an obstacle in its own lane, but also when a vehicle in the adjacent lane is moving out of its proper lane and beginning to cross the centerline of the highway.

It is therefore the principal object of this invention to provide an improved system for detecting the presence of an obstacle within an area surrounded by an electrically excited coil. Another object is to provide obstacle detection apparatus which is compatible with presently available speed detection apparatus. A further object is to provide obstacle detection apparatus which is adapted to be uniformly responsive to the presence of obstacles within a given area.

In accordance with this invention, an obstacle detection system is provided wherein each block is defined by a primary loop which is excited by a low frequency signal. A plurality of secondary loops are utilized and these coils are connected in opposing pairs. Adjacent pairs of the secondary coils overlap so that at least one pair will be responsive to the presence of a large conductive object, no matter where the object is within the given area. In a modification of this invention, the secondary coils are positioned such that they overlap into an adjacent lane whereby a given system will be responsive to vehicles in adjacent lanes before they enter the automatic lane associated with this given system.

The novel features of this invention are set forth with particularity in the appended claims. The invention itself may best be understood by reference to the following description of specific embodiments thereof, taken in conjunction with the accompanying drawing, in which:

FIGURE 1 is a plan view of an obstacle detection system incorporating the principal features of the invention and adapted for use in an automatic highway system;

FIGURE 2 is a graphic representation of the output of the detector loops of FIGURE 1 as a function of the position of the obstacle;

FIGURE 3 is a plan view of a modification of the obstacle detection system of FIGURE 1;

FIGURE 4 is a cross sectional elevation of the system of FIGURE 3;

FIGURE 5 is a graphic representation of the output of the detector loops of FIGURES 3 and 4 as a function of the position of an obstacle; and FIGURE 6 is a block diagram of electrical apparatus adapted for use with the systems of FIGURES 1 and 3.

With reference to FIGURE 1, there is shown a portion of a highway 10 having adjacent lanes 11 and 12 which are adapted to carry vehicular traffic in the same direction and which are separated by a centerline 13. The highway is divided into a series of blocks each of which is defined by a loop such as a primary loop 14. This loop 14 is excited or driven by an alternating current source 15 which has a frequency on the order of 10 kilocycles. The longitudinal distance through which the loop 14 extends along the roadway would depend upon the desired spacing of the vehicles and may be, for example, 200 feet. While the loop 14 surrounds both of the lanes 11 and 12, only the lane 12 is shown to be adapted for automatic car control. The lane 11 will be a manual lane for vehicles having no automatic controls. In the automatic lane 12, there is disposed a plurality of secondary detector coils including a first pair of secondary loops 16 and 17 which are connected together in an opposing relationship. Each secondary loop consists of one or more turns of wire buried beneath the surface of the roadway. If the length of the primary loop 14 is 200 feet, then the corresponding lengths of the secondary loops 16 and 17 would be about 58 feet and 72 feet, respectively. The loops 16 and 17 are connected to common output terminals 18.

Also disposed beneath the surface of the automatic lane 12 are a second pair of secondary loops 19 and 20 which are likewise connected in an opposing relationship to common output terminals 21. The lengths of the loops 19 and 20 are about 72 feet and 58 feet, respectively. A pair of balancing coils 22 and 23, which are transformers having variable couplings, are connected between the primary loop 14 and the secondary loops 17 and 19, respectively. It should be noted that substantial overlap exists between the loops 16 and 19, between the loops 19 and 17, and between the loops 17 and 20. This overlap is about 22 feet in each case.

Adjacent each end of the loop 14 are similar primary loops 26 and 27 and included within these loops would be sets of secondary detector coils which are not shown. Each primary loop defines one of a series of blocks in the automatic lane and the overall system is adapted to determine whether or not an obstacle is present in each block so that vehicles in preceding blocks may be warned or controlled accordingly.

In the operation of the system of FIGURE 1, the balancing coils 22 and 23 are adjusted so that there is no resultant output at either the terminals 18 or the terminals 21 when no vehicle is present in the lane 12. That is, the voltage induced in the loops 16 or 19 due to the current in the primary loop 14 exactly equals and cancels the voltage induced in the loops 17 or 20, respectively.

When a large conductive object such as an automotive vehicle moves into position above one of the secondary detector loops 16, 17, 19, or 20, then there will be a reduction in the voltage induced in that particular coil due to the eddy currents in the conductive material. For example, a vehicle 28, shown in position above the center of the loop 16, will reduce the voltage induced in the loop 16 but will not affect the voltage induced in the loop 17, and so there will be a resultant output across the terminals 18. In FIGURE 2, there is shown a graph 30 which represents the voltage appearing across the terminal 18 plotted as a function of the position of a vehicle within the portion of the lane 12 surrounded by the primary loop 14. It is seen that a vehicle moving from left to right in the lane 12 will produce a large unbalance while above the loop 16 as represented by a portion 31 of the curve. Then when the vehicle is between the loops 16 and 17, there will be a minimum portion 32 and this will be followed by a second portion 33 of high unbalance voltage when the vehicle is above the loop 17. Subsequently, a second minimum portion 34 will appear when the vehicle has passed the loop 17. FIGURE 2 also includes a second graph 36 which represents the voltage appearing across the terminals 21 as a function of the position of a vehicle in the lane 12. It is seen that a vehicle traversing the lane 12 from left to right will initially enter a minimum portion 37 which coincides with the portion 31 of high unbalanced output from the other pair of loops 16, 17. This will be followed by portion 38 of high output which coincides with the minimum portion 32 of the other pair. Subsequently, a minimum portion 39 and a high output portion 40 will appear. It is seen that there will be a high voltage output from either the terminals 18 or the terminals 21, no matter what position the vehicle 28 assumes in the lane 12.

With reference to FIGURE 3, there is shown a portion of a highway 45 having adjacent lanes 46 and 47 separated by a centerline 48. Here both of the lanes 46 and 47 are adapted for automatic operation. Each block is defined by an electrically excited wire loop such as a primary loop 49, a portion of which is shown. The loop 49 is excited by alternating current source 50 which has a frequency of approximately 10 kc. as above. Within each block, each lane contains two pairs of opposing secondary loops. These loops overlap not only in the longitudinal direction as in FIGURE 1, but also in the transverse direction. For example, in the lane 46 there is disposed a pair of secondary loops 51 and 52 which are connected in an opposing relationship to a pair of common output terminals 53. A second pair of secondary loops includes a loop 54 which overlaps the loop 51 and the loop 52 and is connected in an opposing relationship to another loop, not shown, as set forth above. The secondary loops 52 and 54 include balancing coils as above such as a coil 55. The loops 51, 52, and 54 are shown overlapping into the adjacent lane 47 by a considerable distance, about 3 feet.

In the lane 47, there is a separate detection system comprised of a series of secondary loops exactly like the secondary loops in the lane 46. A loop 58 is connected in opposition to a loop 59 and to a pair of common output terminals 60. A loop 61, overlapping the loops 58 and 59, is connected in opposition to another secondary loop, not shown. Balancing coils such as a coil 62 are provided so that the coupling can be adjusted to produce zero voltage at the output terminals 60 when no obstacle is present. The secondary loops 58, 59, and 61 also overlap the lane 46 by about 3 feet. In FIGURE 4, the relative positions of the primary loop 49 and the secondary loops 51 and 58 are apparent.

In FIGURE 5, there is shown a graph 66 which represents the output voltage of one pair of the secondary loops in the lane 46 such as, for example, the output appearing at the terminals 53. It is seen that the response of the pair of loops 51, 52 extends over into the adjacent lane 47. Also there is shown a graph 67 which represents the unbalance output voltage of the secondary loops in the lane 47 such as the voltage appearing across the terminals 69. If a vehicle is in the center of the lane 46, or the centerline of the vehicle coincides with the line 68 of FIGURE 5, then it is seen that the output at the terminals 53 as represented by the graph 66 will be very high while the output at the terminals 60 as represented by the graph 67 will be low. However, if the vehicle moves over toward the center of the highway 45, or toward the lane 47, so that the centerline of the vehicle coincides with the line 69, it is seen that the output appearing at the terminals 53 remains at a high value while the output appearing at the terminals 60 builds up to a relatively high unbalance voltage. Thus the vehicles in the lane 47 may be warned that a vehicle is about to cross the centerline 48 into their lane.

In FIGURE 6, there is shown in block diagram form an electric system adapted for use with the primary and secondary loop arrangements of FIGURES 1 and 3 to provide obstacle detection and speed warning outputs such as are described in the co-pending application S.N. 759,731, now Patent No. 3,068,448, filed September 8, 1958. Here there is provided a first channel having an amplifier 72 which derives its input from one of the pairs of opposing secondary loops such as the output terminals 18 of FIGURE 1. This amplifier 72 is connected to a detector 73 which provides a D.C. output related in magnitude to the amplitude of the alternating unbalance voltage appearing at the terminals 18. The output of the detector is connected to a further amplifier 74 which is adapted to drive a voltage responsive device 75 which may provide a warning that an obstacle is present or may provide a control signal for slowing down or stopping vehicles approaching in the same lane as set forth in the abovementioned Patent No. 3,068,448. There is also provided a second channel including an amplifier 76 which derives its input from the other pair of opposing secondary loops such as the output terminals 21. The output of the amplifier 76 is connected to a detector 77 which likewise provides a D.C. output related in magnitude to the alternating unbalance input. This detector 77 is connected to the same input of the amplifier 74 so that an unbalance voltage existing at either the terminals 18 or the terminals 21 will energize the voltage responsive device 75. Also, there may be connected to the output of one of the channels, such as at the detector 77, an obstacle speed responsive device 78 which is adapted to detect the amount of time that is required for a vehicle to travel from the high unbalance voltage region of one of a pair of secondary loops to the other such region of this pair. That is, the device 78 would be responsive to the time interval required by a vehicle to travel from the region of the highway corresponding to the portion 38 of the graph 36 to the region corresponding to the portion 40. If this time interval is less than a given value, the vehicle is going too slow and following vehicles may be so warned. If greater than the given value, then the vehicle is exceeding the desired speed and so vehicles ahead can be warned. The characteristics of such a system are disclosed in the above-mentioned Patent No. 3,068,448.

Where both lanes are automatic as in FIGURE 3, two of the systems shown in FIGURE 6 are employed, one being connected to the two pairs of secondary loops in the lane 46, and one being connected to the two pairs of secondary loops in the lane 47.

While the invention has been described in terms of specific embodiments, it will of course be understood that the invention is not limited thereto. Various modifications may be made by persons skilled in the art, and it is contemplated that the appended claims will cover any such modifications as fall within the true scope of the invention.

I claim:

1. In a system for detecting the presence of obstacles in a given area, a primary loop surrounding said given area, an alternating current source exciting said primary loop, first and second pairs of secondary loops located in said given area, each of said pairs of secondary loops being connected in series opposition such that the voltages induced in the respective loops of each pair are of opposite polarity, the sum of which voltages is normally zero, adjacent second loops in said first and second pairs being positioned such that each of the secondary loops encompasses a portion of the area encompassed by the adjacent secondary loop whereby said system will be responsive to obstacles at any position within said given area.

2. In a system for detecting the presence of vehicles in a given portion of one lane of a roadway, a primary loop surrounding said given portion, an alternating current source exciting said primary loop, first and second pairs of secondary loops positioned along said given portion, and voltage responsive means connected across each of said pairs of secondary loops, the loops in each of said first and second pairs of secondary loops being connected in series opposition such that the voltages induced in the respective loops of each pair are of opposite polarity, the sum of which voltages is normally zero, said voltage responsive means being connected to receive said sum whereby there will be a resultant output presented to said voltage responsive means only when a vehicle is located within the area surround by one of the secondary loops of said first and second pairs, adjacent secondary loops in said first and second pairs being positioned to encompass a common area over a portion of the respective lengths thereof whereby said voltage responsive means will be responsive to a vehicle at any position within said given portion, said secondary loops being positioned to overlap a lane of said roadway adjacent said one lane.

3. In a system for detecting the presence of large conductive objects in a given area, a primary loop surrounding said given area, a low frequency alternating current source connected to energize said primary loop, a first loop enclosing a first portion of said given area, a second loop enclosing a second portion of said given area displaced from said first portion, said first and second loops being connected together in series opposition across a first pair of output terminals such that the sum of the voltages induced in said first and second loops is normally zero, whereby a voltage will be presented to said first output terminals only when a large conductive object is within one of said first and second portions, a third loop enclosing a third portion of said given area, said third portion including a substantial part of each of said first and second portions, a fourth loop enclosing a fourth portion of said given area, said fourth portion including a substantial part of said second portion and being displaced from said third portion, said third and fourth loops being connected together in series opposition across a second pair of output terminals such that whereby a voltage will be presented to said second output terminals only when a large conductive object is within one of said third and fourth portions, and voltage responsive means connected to said first and second pairs of output terminals.

4. In a system for detecting the presence of vehicles in a given area of one lane of a roadway, a primary loop surrounding said given area, a low frequency alternating current source connected to energize said primary loop, a first loop enclosing a first portion of said given area, a second loop enclosing a second portion of said given area displaced from said first portion, said first and second loops being connected together in series opposition across a first pair of output terminals, a third loop enclosing a third portion of said given area, said third portion including a substantial part of each of said first and second portions, a fourth loop enclosing a fourth portion of said given area, said fourth portion including a substantial part of said second portion and being displaced from said third portion, said third and fourth loops being connected together in series opposition across a second pair of output terminals, and voltage responsive means connected to said first and second pairs of output terminals, each of said first, second, third, and fourth loops also overlapping a lane of said roadway adjacent said one lane.

References Cited in the file of this patent
UNITED STATES PATENTS

| | | |
|---|---|---|
| 2,532,231 | Jarvis | Nov. 28, 1950 |
| 2,537,298 | Banghman | Jan. 9, 1951 |
| 2,733,388 | Rechten | Jan. 31, 1956 |